United States Patent
Curry et al.

(10) Patent No.: US 7,386,166 B2
(45) Date of Patent: Jun. 10, 2008

(54) SYSTEMS AND METHODS FOR CONNECTING REGIONS IMAGE DATA HAVING SIMILAR CHARACTERISTICS

(75) Inventors: Donald J. Curry, Menlo Park, CA (US); Asghar Nafarieh, Menlo Park, CA (US); Doron Kletter, San Mateo, CA (US); Todd W Thayer, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 960 days.

(21) Appl. No.: 10/776,608

(22) Filed: Feb. 12, 2004

(65) Prior Publication Data
US 2005/0180649 A1   Aug. 18, 2005

(51) Int. Cl.
*G06K 9/00* (2006.01)

(52) U.S. Cl. .................. 382/164; 382/173; 382/305; 358/1.2

(58) Field of Classification Search .............. 382/26, 382/260, 56, 115, 243, 173, 164, 166, 305; 358/260, 261, 1.2, 3.3
See application file for complete search history.

(56) References Cited

U.S. PATENT DOCUMENTS

| | | | |
|---|---|---|---|
| 4,718,090 A * | 1/1988 | Cooper, Jr. ............... | 382/204 |
| 4,849,914 A | 7/1989 | Medioni et al. | |
| 5,515,452 A | 5/1996 | Penkethman et al. | |
| 5,543,700 A * | 8/1996 | Sakano et al. ............. | 318/701 |
| 5,583,659 A | 12/1996 | Lee et al. | |
| 5,583,949 A * | 12/1996 | Smith et al. .............. | 382/199 |
| 5,745,596 A | 4/1998 | Jefferson | |
| 5,900,953 A | 5/1999 | Bottou et al. | |
| 6,058,214 A | 5/2000 | Bottou et al. | |
| 6,324,305 B1 | 11/2001 | Holladay et al. | |
| 6,343,154 B1 | 1/2002 | Bottou et al. | |
| 6,400,844 B1 | 6/2002 | Fan et al. | |
| 6,633,670 B1 | 10/2003 | Matthews | |
| 7,006,244 B2 * | 2/2006 | Loce ......................... | 358/1.2 |

FOREIGN PATENT DOCUMENTS

| | | |
|---|---|---|
| EP | 0 712 094 A2 | 5/1996 |
| EP | 1 006 716 A2 | 6/2000 |
| WO | WO 02/056255 A2 | 7/2002 |

OTHER PUBLICATIONS

R. De Queiroz, "Compression of Compound Documents," *IEEE*, Oct. 1999, pp. 209-213.
U.S. Appl. No. 10/187,499, filed Jul. 1, 2002, Curry et al.

(Continued)

*Primary Examiner*—Samir A. Ahmed
*Assistant Examiner*—Mehdi Rashidian
(74) *Attorney, Agent, or Firm*—Oliff & Berridge, PLC

(57) ABSTRACT

Image data is analyzed line by line to identify pixels having similar color and edge characteristics. The pixels on one line are linked to pixels on another line, if they share similar characteristics. The linked pixels are then grouped together in regions and the average color of the region is calculated. An image map is generated that identifies the regions to which the pixels belong, along with a final table of the regions appearing in the image.

21 Claims, 16 Drawing Sheets

OTHER PUBLICATIONS

U.S. Appl. No. 10/188,026, filed Jul. 1, 2002, Curry et al.
U.S. Appl. No. 10/188,249, filed Jul. 1, 2002, Curry et al.
U.S. Appl. No. 10/188,277, filed Jul. 1, 2002, Curry et al.
U.S. Appl. No. 10/188,157, filed Jul. 1, 2002, Curry et al.
U.S. Appl. No. 10/612,250, filed Jul. 1, 2003, Curry et al.
U.S. Appl. No. 10/612,057, filed Jul. 1, 2003, Curry et al.
U.S. Appl. No. 10/612,234, filed Jul. 1, 2003, Curry et al.
U.S. Appl. No. 10/612,461, filed Jul. 1, 2003, Curry et al.
U.S. Appl. No. 10/612,062, filed Jul. 1, 2003, Curry et al.
U.S. Appl. No. 10/612,261, filed Jul. 1, 2003, Curry et al.
U.S. Appl. No. 10/612,246, filed Jul. 1, 2003, Curry et al.
U.S. Appl. No. 10/612,368, filed Jul. 1, 2003, Curry et al.
U.S. Appl. No. 10/612,248, filed Jul. 1, 2003, Curry et al.
U.S. Appl. No. 10/612,063, filed Jul. 1, 2003, Curry et al.
U.S. Appl. No. 10/612,064, filed Jul. 1, 2003, Curry et al.
U.S. Appl. No. 10/612,084, filed Jul. 1, 2003, Curry et al.
U.S. Appl. No. 10/776,515, filed Feb. 12, 2004, Curry et al.
U.S. Appl. No. 10/776,514, filed Feb. 12, 2004, Curry et al.
U.S. Appl. No. 10/776,612, filed Feb. 12, 2004, Curry et al.
U.S. Appl. No. 10/776,602, filed Feb. 12, 2004, Curry et al.
U.S. Appl. No. 10/776,620, filed Feb. 12, 2004, Curry et al.
U.S. Appl. No. 10/776,603, filed Feb. 12, 2004, Curry et al.
U.S. Appl. No. 10/776,509, filed Feb. 12, 2004, Claassen et al.
U.S. Appl. No. 10/776,508, filed Feb. 12, 2004, Curry et al.
U.S. Appl. No. 10/776,516, filed Feb. 12, 2004, Curry et al.
Zugaj et al., "A New Approach of Color Images Segmentation Based on Fusing Region and Edge Segmentations Outputs," Pattern Recognition, vol. 31, No. 2, pp. 105-113, 1998.
Lambert et al., "Symbolic fusion of luminance-hue-chroma features for region segmentation," Pattern Recognition, vol. 32, pp. 1857-1872, 1999.

* cited by examiner

| RESERVED FOR BACKGROUND | 0 |
| --- | --- |
| ID = 1 | 2 |
| ID = 2 | 4 |
| ID = 3 | 6 |
| ID = 4 | 8 |
| | |
| MAX ID = 255 | |

2 BYTES PER SCAN TABLE ENTRY

FIG. 6

SYSTEMS AND METHODS FOR CONNECTING REGIONS IMAGE DATA HAVING SIMILAR CHARACTERISTICS

This invention is related to U.S. patent application Ser. Nos. 10/776,612, 10/776,515, 10/776,514, 10/776,602, 10/776,603, 10/776,620, 10/776,508, 10/776,508 and 10/776,516, filed on an even date herewith and incorporated by references in their entireties.

BACKGROUND OF THE INVENTION

1. Field of Invention

This invention is directed to organizing image data into regions having similar color characteristics.

2. Related Art

Documents scanned at high resolutions typically require very large amounts of storage space. Furthermore, a large volume of image data requires substantially more time and bandwidth to manipulate, such as transferring over a local or wide area network, over an intranet, an extranet or the Internet, or other distributed networks.

Documents, upon being scanned using a scanner or the like, are typically defined using an RGB color space, i.e., in raw RGB format. However, rather than being stored in this raw scanned RGB format, the document image data is typically subjected to some form of data compression to reduce its volume, thus avoiding the high costs of storing such scanned RGB document image data.

Lossless run-length compression schemes, such as Lempel-Ziv (LZ) or Lempel-Ziv-Welch (LZW), do not perform particularly well on scanned image data or, in general, image data having smoothly varying low-spatial frequencies such as gradients and/or natural pictorial data, while lossy methods such as JPEG, work fairly well on smoothly varying continuous tone image data. However, lossy methods generally do not work particularly well on binary text and/or line art image data, or, in general, on any high spatial frequency image data containing sharp edges or color transitions, for example.

SUMMARY OF THE DISCLOSURE

Systems and methods are described which can identify pixels belonging to regions in an image which share color and edge continuity characteristics. The regions are identified by first scanning an image from top-to-bottom, and identifying pixels in each scan line which belong to the same group. A ylink field then links the group of pixels in one line, with groups of pixels in other lines, which share the same color and edge continuity characteristics. The groups are linked together into two dimensional regions which can then be processed as a group.

This method for identifying regions in an image can be applied to mixed raster content (MRC) format image data. MRC is a method particularly suited to processing image data of a composite image having text intermingled with color and/or gray-scale information, wherein the image is segmented into two or more planes. These planes are generally referred to as the background plane and the foreground planes. A selector plane is generated to indicate, for each pixel in the composite image, which of the image planes contains the actual image data that should be used to reconstruct the final output image. Segmenting the image data into planes in this manner tends to improve the overall compression of the image, because the data can be arranged into different planes such that each of the planes are smoother and more compressible than is the original image data. Segmentation also allows different compression methods to be applied to the different planes. Thus, the most appropriate compression technique for the type of data in each plane can be applied to compress the data of that plane.

Unfortunately, some image document formats, such as the portable document format (PDF), do not fully support such three-layer mixed raster content decompositions of an original document. As a result, when attempting to print or otherwise render a document that has been compressed and stored as a mixed raster content image data file using such image document formats, the document either cannot be rendered at all, or contains objectionable artifacts upon rendering.

This invention provides systems and methods for converting a document to image data in a mixed raster content format having multiple binary foreground planes. Systems and methods are described for gathering pixels of the image data having one or more related characteristics into regions, called "blobs", which have a continuous closed curve boundary enclosing pixels having similar edge continuity values. A module is described which takes as input a scan table which identifies blobs occurring on a single scan line of the image, and connects these blobs occurring in a single scan line, to those occurring in previous scan lines. Because the module begins at the bottom of the page and works its way back to the top, the module is called the bottom-to-top module. The bottom-to-top module then generates a global table of blobs, which describes with a consistent identification number, all blobs occurring on a page of image data.

Once a global table of blobs is generated, the table is output to a downstream processing module, which clusters together the various blobs according to their spatial relationships and color similarities. Each of the clusters of regions can then be placed into one of the plurality of binary foreground planes. In particular, each region that is gathered into a given binary foreground plane that has a color that is sufficiently similar to that binary foreground plane that a high quality image can be reproduced with acceptable color rendering in the output image.

BRIEF DESCRIPTION OF DRAWINGS

Various exemplary embodiments of systems and methods of this invention will be described in detail, with reference to the following figures, wherein:

FIG. 6 shows an exemplary scan table structure;

DETAILED DESCRIPTION

Various exemplary embodiments of systems and methods are disclosed that automatically process scanned and/or printed color documents to produce small, highly-compressed image data files that accurately capture the original document content. Data files are generated by scanning in documents, and analyzing the data in a given scan line to determine which pixels of the image can be grouped together because they have similar color and edge characteristics. The scan lines are then linked according to information in a link field, to generate two-dimensional regions of pixels of similar color, and defined by a closed curve boundary. These regions, or "blobs", are then clustered together by combining areas of similar color which overlap spatially. The combined areas (clustered regions) are then placed in one of a plurality of binary foreground layers, and may be compressed for output as a PDF file, for example.

Figure 1:
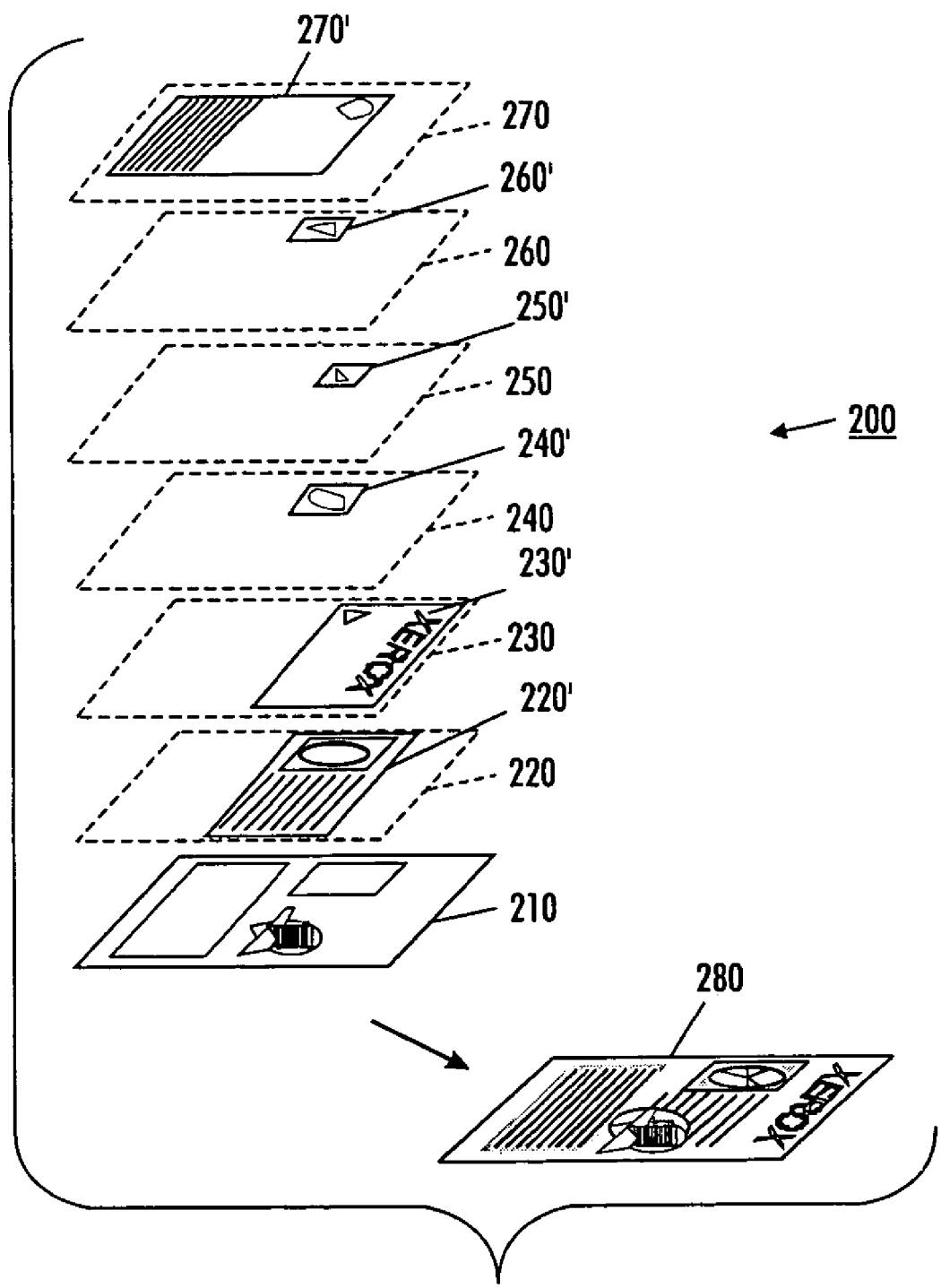
FIG. 1 illustrates an exemplary document image decomposed into multiple binary foreground image planes and a background plane.

FIG. 1 shows image data of a document that is decomposed into a background continuous tone or grayscale layer (background layer) 210 and N binary foreground layers. In this example, there are six (N=6) binary foreground layers 220-270. The image data contains low spatial frequency color data that are separated into six distinct color values. Each of the six color values is associated with a particular one of the multiple binary foreground layers 220-270 which include spatial regions 220'-270' that contain one of the six colors. Data not included in one of the regions 220'-270' remains in the background layer 210. Systems and methods will be described for generating the spatial regions 220'-270' that will each be clustered into a binary foreground layer.

An input pixel can only be assigned to one of the multiple foreground planes or left in the background plane. Therefore, image data portion in any of the multiple binary foreground layers 220-270 does not overlap other image data portions in any of the other multiple binary foreground layers 220-270. As a result, each of the binary foreground layers 220-270 can be individually combined with the background layer 210 without regard to order or sequence. When all of the multiple binary foreground layers 220-270 are combined with the background layer 210, the reconstructed image 280 is obtained.

Systems and methods are described for identifying the blobs which will be clustered into regions 220'-270' that are to be assigned to each binary image plane.

Figure 2:
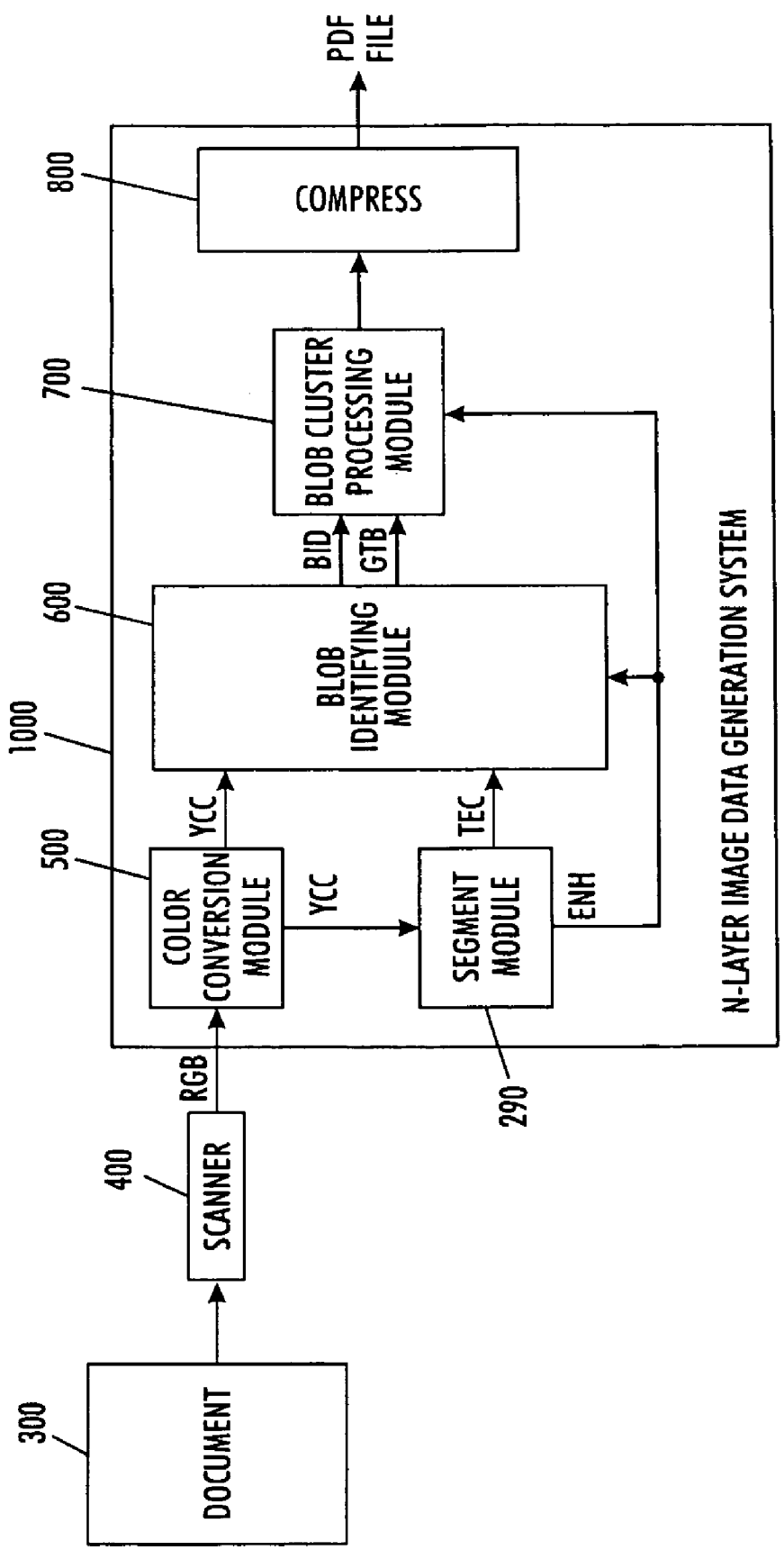
FIG. 2 illustrates one exemplary system in which the blob identifying module can operate.

FIG. 2 shows an exemplary system for generating the N binary foreground layers from a scanned document image. FIG. 2 shows a document 300, being scanned by a scanner 400 to generate image data in, for example, an RGB color space, and the image data is input to the N-layer image data generating system 1000. The N-layers produced by the N-layer image data generating system 1000 are then compressed by compress module 800 and output as a PDF file, for example.

The first module in the N-layer image data generating system 1000 is the color conversion module 500. The color conversion module 500 may convert the RGB data to a YCC color space, for example. As is well known, the YCC color space includes a luminance component (Y) and two chroma components (CC). The chroma components may be sub-sampled at a 2:1 ratio, at least in one direction if not in both, so that there are half as many data points in the chroma components as there are in the luminance components. Other color spaces, such as Lab may also be used.

The image in the YCC color space may then be input to a blob identifying module 600 which generates a list of the regions, or blobs, appearing in the image. The blobs are identified based on color and edge characteristics. Blobs are regions having a continuous boundary, which encloses pixels having similar color values. The blob identifying module 600 assigns a blob ID to each pixel in the image, indicating to which blob, if any, the pixel belongs. Pixels which do not belong to blobs are assigned to the background layer. A map of the blob IDs for each pixel location is a blob identification (blob ID) image, and is generated by the blob identifying module 600.

The blob identifying module 600 also generates a global table of blobs (GTB) which is a list of all blobs found in the document image 280. The systems and methods described herein are for the generation of the blob ID image and the GTB. The blob ID image and the GTB will be described further below, along with examples, in reference to the blob identifying module 600.

The blob ID data, the GTB are then input to the blob cluster processing module 700. The blob cluster processing module 700 then organizes the blobs in the global table of blobs, associating blobs of similar color and which overlap spatially into clusters. The blob cluster processing module 700 assigns the clustered regions to one of N foreground planes, depending on the color value of the combined region.

The blob cluster processing module 700 outputs the binary data for each of the binary foreground layers and the background layer to the compress module 800. The compress module 800 may compress each of the binary foreground layers and the background layers differently, using a compression routine that is appropriate for the particular type of data being compressed, to generate compressed image data for the binary foreground layers and the background layer. The compress module 800 may then output the compressed binary foreground and background layers in a suitable format, such as PDF format, to a downstream process.

Figure 3:
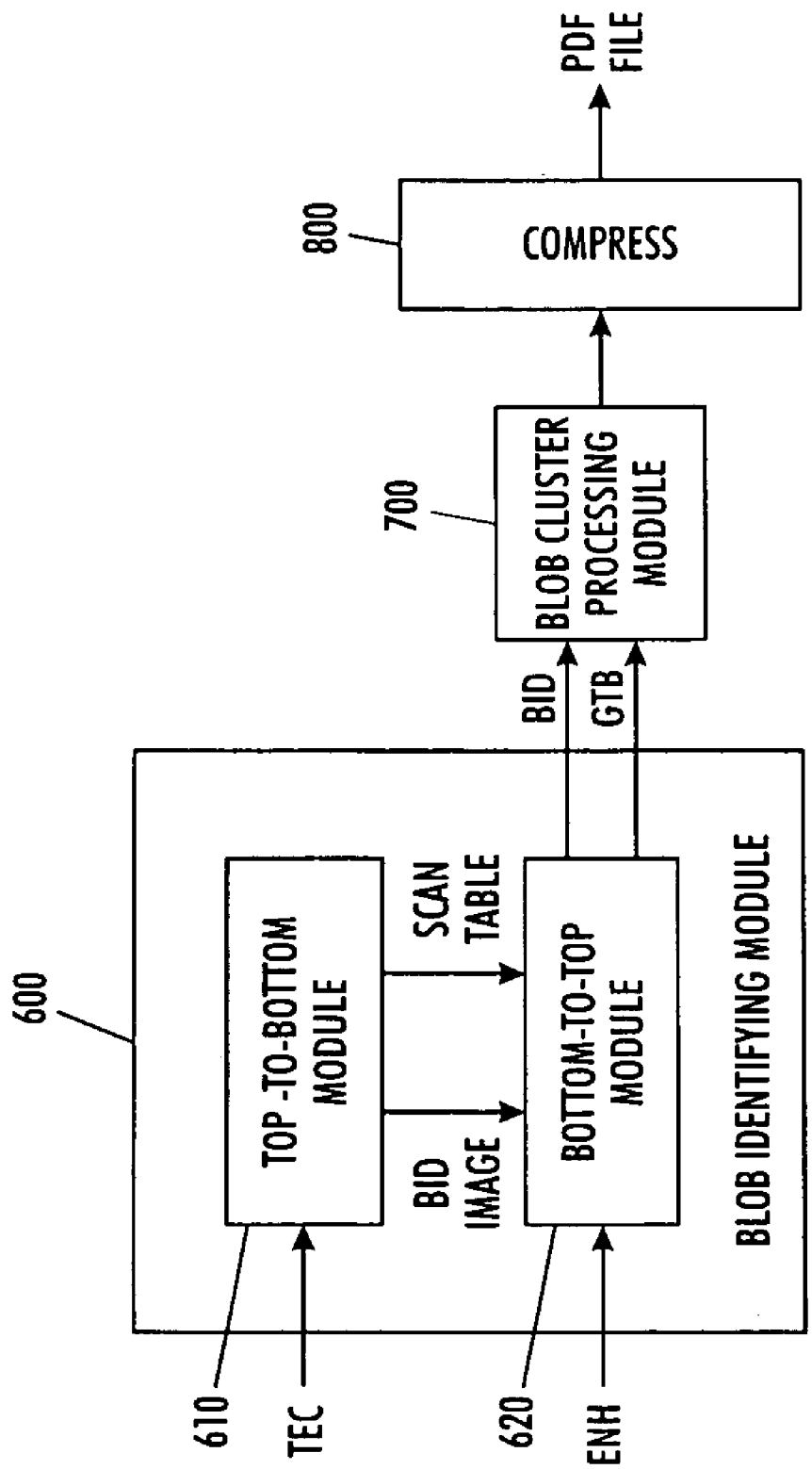
FIG. 3 illustrates in greater detail an exemplary embodiment of a blob identifying module.

FIG. 3 shows further detail of an exemplary blob identifying module 600. The blob identifying module includes a top-to-bottom module 610 and a bottom-to-top module 620. The top-to-bottom module 610 examines each pixel in a scan line, along with a number of context pixels, and identifies to which blob the pixel of interest belongs. The top-to-bottom module 610 then outputs a scan table for each scan line, which includes an identification of up to 255 blobs, or other convenient number, which may appear in any particular scan line of the image. Since the blobs identified by the top-to-bottom module 610 are contained within a single scan line, the blobs in this situation are one-dimensional "linear" blobs. The top-to-bottom module 610 also generates a blob ID image, which assigns to each scanned pixel in the image the identification of the blob listed in the scan table, to which the particular pixel belongs. The operation of the top-to-bottom module 610, and the generation of the scan table, is described in detail in co-pending U.S. patent application Ser. No. 10/776,515 filed on an even date herewith and incorporated by reference in its entirety.

Figure 5:
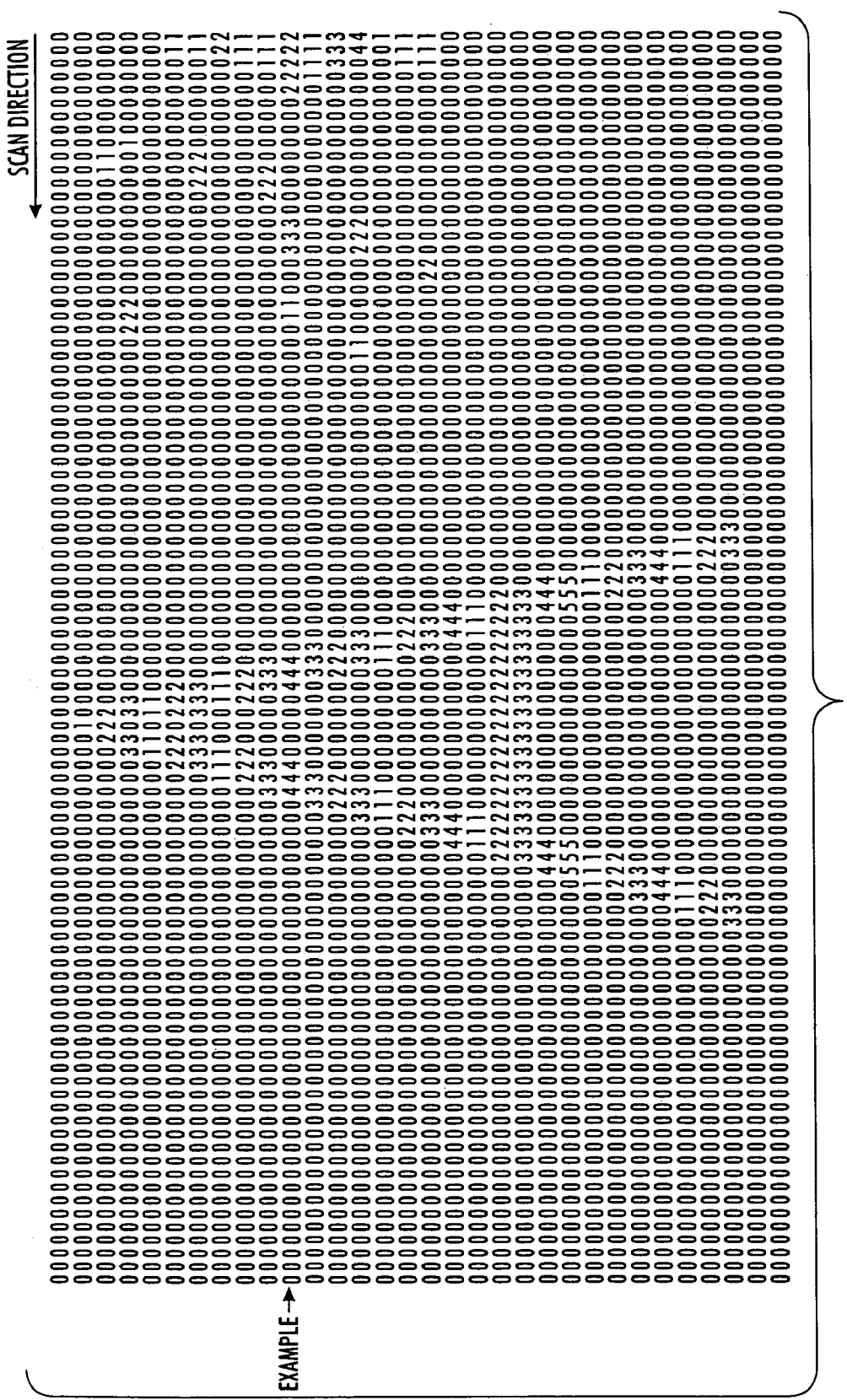
FIG. 5 illustrates an exemplary blob ID image, in which the regions indicated refer to the scan tables.

An example of an initial blob ID image is shown in FIG. 5. The blob ID image has a blob identifier for each pixel in the image. The blob ID image shown in FIG. 5 has a blob, roughly in the shape of an "A" character, whose extent and identity will be determined using the systems and methods according to this invention.

Figure 4:
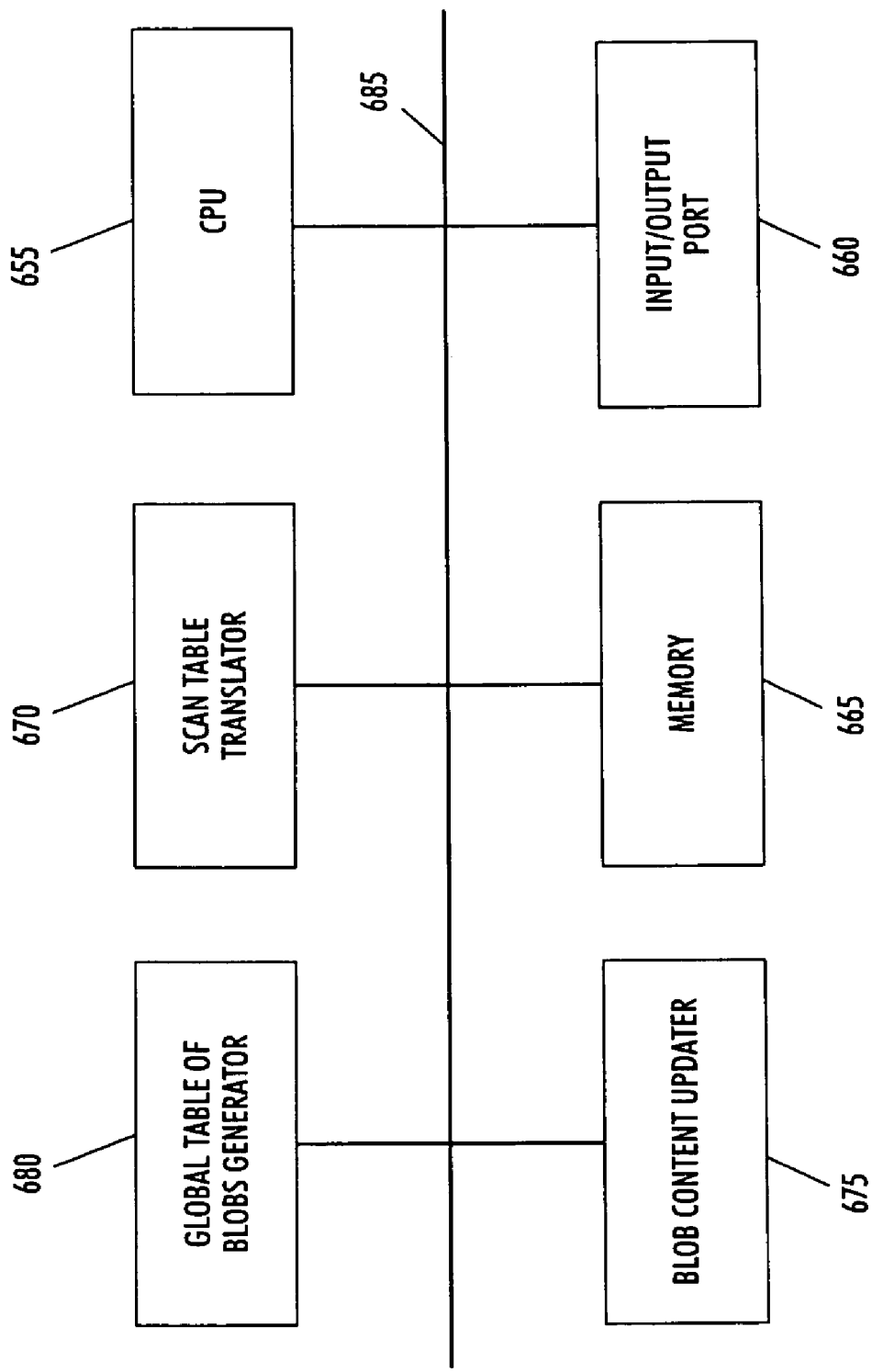
FIG. 4 illustrates in greater detail an exemplary embodiment of a bottom-to-top module.

FIG. 4 shows further detail of the bottom-to-top module 620. The bottom-to-top module 620 includes a CPU 655, and input/output port 660, a memory 665, a scan table translator 670, a blob content updater 675, and a global table of blobs generator 680. The above components 655-680 may be coupled together via a bus 685. While the bottom-to-top module 620 is illustrated using a bus architecture diagram, any other type of hardware configuration may be used such as using application specific integrated circuits (ASICs) to implement one or more of the components, or writing a computer program that executes in the CPU 655 to perform all the functions of the bottom-to-top module.

The bottom-to-top module 620 inputs the initial blob ID image, the current scan table for the current scan line, and the previous scan table for the previous scan line through the input/output port 660 from the top-to-bottom module 610, and stores the data in memory 665. The bottom-to-top module may receive the data for one scan line and a previous scan line at a time, or it may receive the data for an entire image, and store the data in memory 665.

Each line in the blob ID image of FIG. 5 is associated with a scan table, which stores information relating to the blobs identified in each scan line. The scan table for the line marked "example" is shown in FIG. 6. The line marked "example" in FIG. 5 has a number of pixels which are associated together. The scan table for this line has four scan table entries, one for blob #4, one for blob #3, one for blob #2, and one for blob #1, as identified in the blob ID image. (Blobs labeled "0" are referred to the background layer.) The pixels belonging to the blob need not be contiguous, and in fact for the example line, they are not. The blob IDs in the initial blob ID image refer to the blob IDs in the current scan table.

Figure 7:
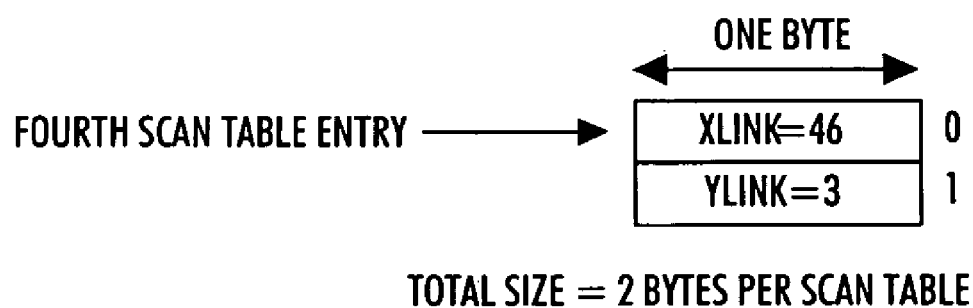
FIG. 7 shows an exemplary scan table entry.

A scan table can hold up to 255 entries, or other convenient number, with each entry using 2 bytes of memory for a 255-entry scan table. An example of a scan table entry is shown in FIG. 7. This scan table entry corresponds to the blob identified as #4 in the blob ID image. The two bytes of the scan table entry include the xlink field and the ylink field. The xlink field links each blob with pixels on the same line, which belong to the same blob. The xlink connections may be maintained as a circular list, so a blob that is not horizontally connected to any other blobs may be connected to itself, that is, the link points to itself. The ylink field links blobs identified on the current scan line, with blobs previously identified on the scan line below. Therefore, the scan table entry for blob #4 of the example line, has an xlink entry which points to the second occurrence of blob #4 on the same scan line, and a ylink entry which links blob #4 to blob #3 on the scan line below.

Each scan entry is 2 bytes in size, and each scan table contains up to 255 valid entries. Therefore the scan table for each scan line requires 256 entries*2 bytes=512 bytes of memory.

The bottom-to-top module 620 will take the scan table entries and link the blobs vertically, by giving the blobs another temporary ID, while the module is assembling the contents of the blob. Like the scan table, the temporary IDs are stored in a table containing up to 255 temporary blob IDs. An example of the temporary blob ID table is shown in FIG. 6.

Figure 9:
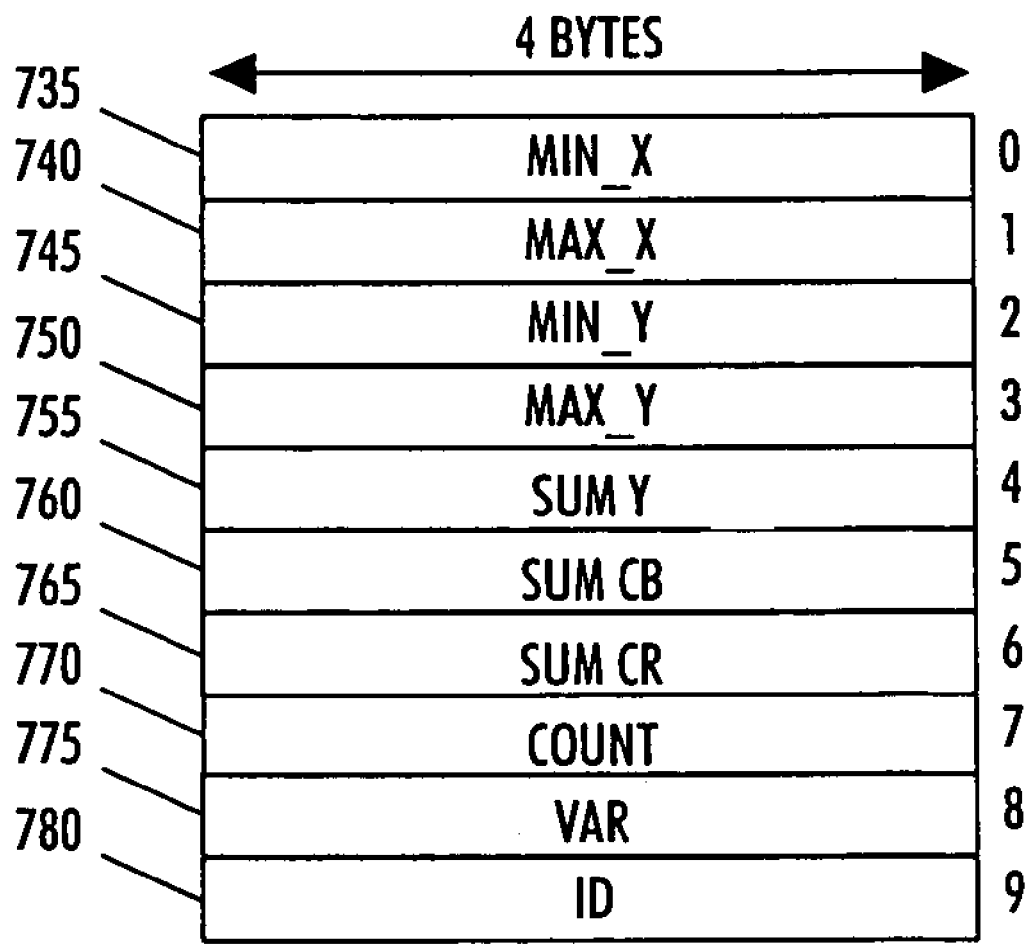
FIG. 9 shows an exemplary temporary blob table entry.

An example of a temporary blob ID entry is shown in FIG. 9. As compared to the scan table ID entry, the temporary ID entry contains additional information related to the two-dimensional aspects of the temporary ID. In particular, the temporary ID entry contains four additional fields, min_x 735, max_x 740, min_y 745 and max_y 750, which are the x- and y-extents of a "bounding box" which surrounds the temporary blob. The bounding box is the smallest rectangle that completely encloses all of the pixels assigned to the blob. As additional pixels are added by the bottom-to-top module, the bounding box is continually updated to reflect the new boundaries after the additional pixels are added.

Like the scan table entries, the temporary blob ID may maintain information on the color value of the blob. This information may include the color sums sum Y 755, sum Cb 760 and sum Cr 765, for example. Finally, like the scan table entries, the temporary blob ID entries store a pixel count 770, and variance data 775. The temporary blob ID entry also identifies and later assigns a blob ID 780 to track the blob.

Each temporary blob ID entry is initialized with the following values:

(i) max_x and max_y are set to −1 (no max position), (ii) min_x is set to image width +1 (no min)

(iii) min_y is set to image height +1 (no min)

Count, var, sum Y, sum Cb, and Sum Cr, are all initialized to zero. The blob IDs are assigned in sequential order from a blob ID stack.

Figure 8:
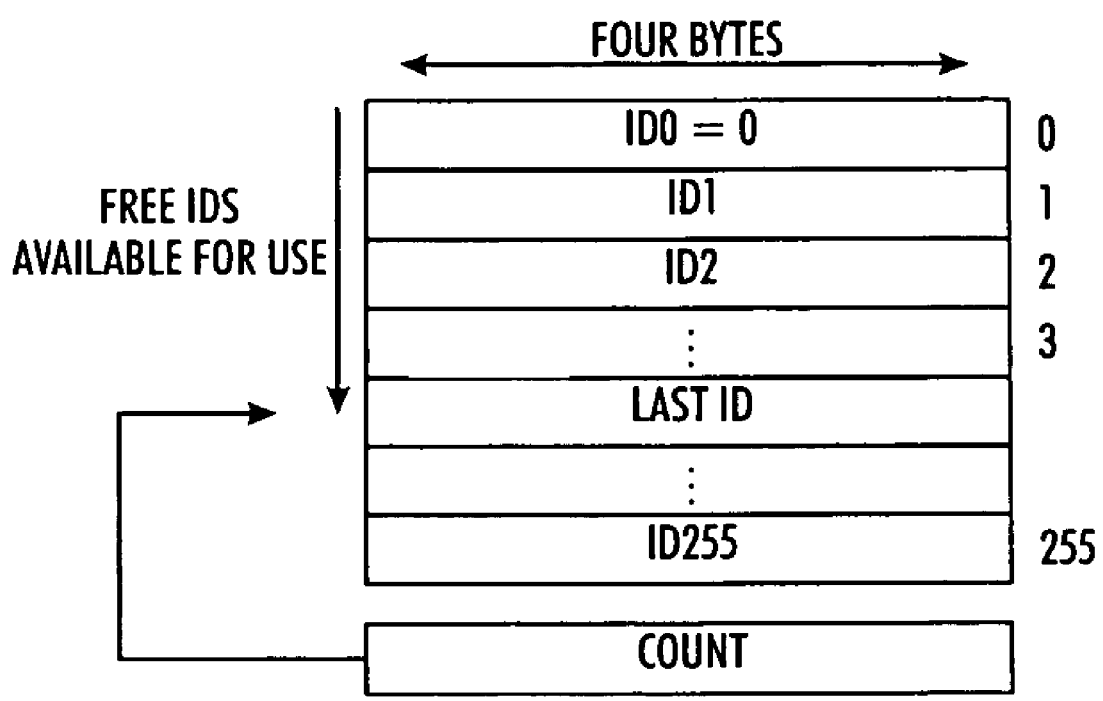
FIG. 8 shows an exemplary temporary blob table ID stack allocation structure.

When the bottom-to-top module first encounters a new blob, it assigns a temporary ID to that new blob. The temporary ID is taken from a blob ID stack table that maintains the list of temporary IDs in use. The structure of the blob ID stack table is shown in FIG. 8. The blob ID stack table can hold up to 256 temporary blob ID entries. One entry, such as the first entry, for example, is reserved for the background plane. The main purpose of the blob ID stack table is to recycle the temporary blob IDs. As soon as one blob is finished, it is outputted to a down stream process and the temporary ID associated with this blob is freed up and made available for reallocation to a new blob through the blob ID stack mechanism.

When the bottom-to-top module 620 determines that the blob is complete, i.e., is enclosed by a continuous boundary and no more additional pixels will be added, the bottom-to-top module 620 will output the contents of the temporary blob ID to the Global Table of Blobs (GTB). The bottom-to-top module 620 also incrementally updates the blob ID image to refer to the new blob identifiers, rather than those used in the local scan table. The updated blob ID image and the GTB are then output for further processing by the blob cluster processing module 700.

The bottom-to-top module 620 may perform essentially four steps on the scan table and blob ID image inputs:

1) Translate the scan table entries to temporary blob IDs in a translation table using the previous translation table on the line below.

2) A second pass on the translation table content may be performed if one or more entries is discovered to contain a terminal xlink value not pointing to itself in a circular manner.

3) Update the blob ID image to temporary blob table content to reflect additional pixels on the current scan-line associated with these temporary blob entries.

4) Export to the GTB any closed temporary blob IDs and free up the resources allocated to a closed blob and make it available for allocation to a new temporary blob as needed.

Figure 10:
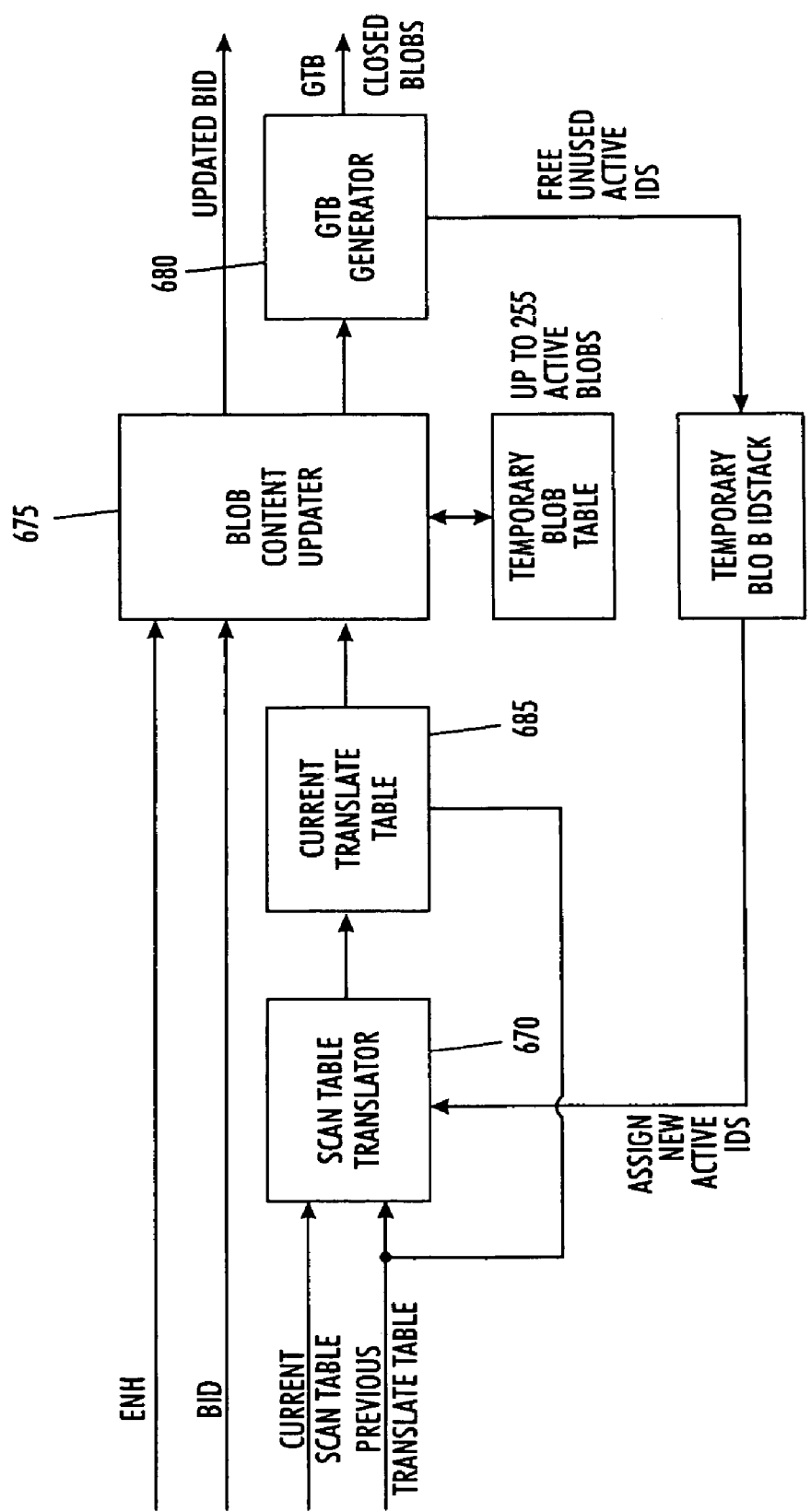
FIG. 10 illustrates an exemplary data flow diagram for the bottom-to-top module shown in FIG. 5.

The flow of data within the bottom-to-top module 620 is illustrated by FIG. 10. As shown in FIG. 10, the scan table entries for the current line are input by the Scan Table Translator 670. The Scan Table Translator 670 translates the scan table entries to temporary blob IDs using the previous translate table of the line below. The blob ID image and enhanced color image ENH is input to the Blob Content Updater 675, which updates the temporary blob table information and blob BID image for all scan table entries on the current line. The GTB generator 680 then determines if any blobs can be closed, and if so, closes the blobs by outputting the blob information to the GTB. The closed blob information is appended to the current GTB, and the current temporary blob ID is replaced by the next available GTB entry in sequential order. Each of these steps will be described in detail below.

Upon receiving the current scan table from the top-to-bottom module 610, and preserving the previous translate table of the line below, the bottom-to-top module 620 evaluates each entry in the current scan table from 1 to 255, to check if it has a valid (non-zero) xlink field.

At this time the bottom-to-top module 620 has already processed the previous scan table of the line below because the module progresses upward. Therefore, the previous scan table entries have already been translated to temporary blob ids, and the same ids will be carried over to the current line when vertically linked. Since the very first scan line (the bottom line of the image) has no previous scan lines to which it can be linked, all ylink values for this first scanline are zero, and each valid blob entry in the first scan line is given an initial temporary blob ID. As this process continues one line at a time from the bottom upward, it "unravels" the vertical ylink connections and re-assigns unique temporary blob ids that are consistent from one line to the next.

Figure 14:
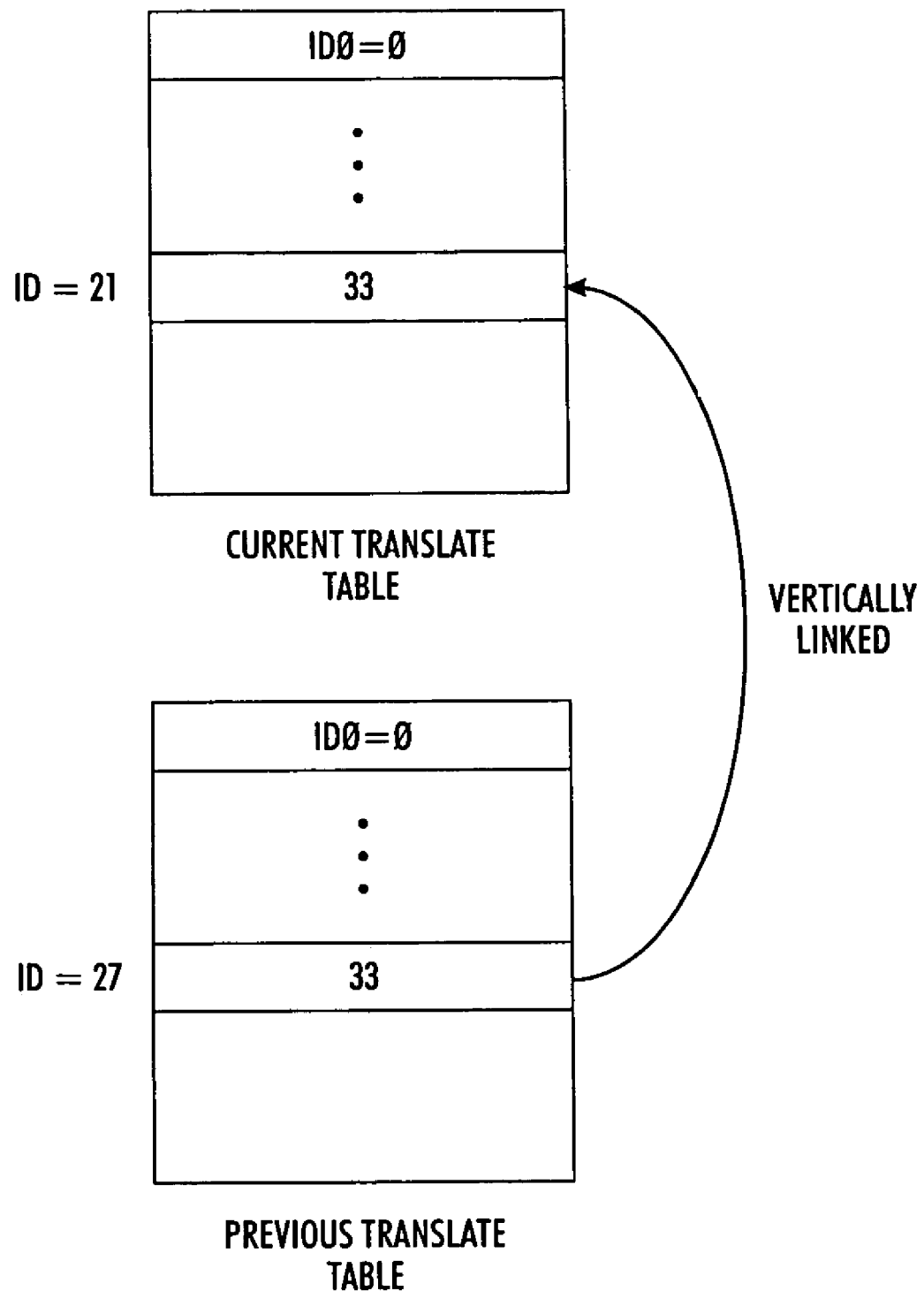
FIG. 14 illustrates the structure of two translate tables.

The bottom-to-top module 620 maintains the assignment of temporary blob IDs by means of a translate table. The bottom-to-top module 620 uses two translate tables, one for the current line and one to maintain the previous translate table from the line below. FIG. 14 shows the structure of the two translate tables. The two translate tables are alternated every line. At the end of the current line, the current translate table becomes the previous translate table for the next line, and the translate table on the line below, since no longer needed, is destroyed by being overwritten by the next line translate table data.

FIG. 14 illustrates one example of a valid blob entry 27 in the scan table for the line below, which is vertically linked to a valid blob entry 21 in the current line scan table. As the line below was processed by the bottom-to-top module 620, the scan table entry 27 was translated to be assigned the temporary ID 33, for example. Since the current line entry 21 is vertically linked to 27 on the line below, the temporary ID 33 is copied and assigned to entry 21 in the translate table of the current line. This indicates that the two seemingly unrelated scan table entries belong to the same temporary blob, and thus are assigned the same temporary blob ID 33.

All subsequent scan lines which refer, via the ylink fields to a blob on an earlier scan line, will share the temporary blob ID from the blob on the earlier scan line. Therefore, the action of the bottom-to-top module is to establish the vertical associations between the identified blobs, transforming the essentially one-dimensional blobs from the scan tables into two-dimensional blobs listed in the temporary table of blobs.

The current blob entry in the scan table is considered to be valid when the xlink field is non-zero. Otherwise, if xlink=0, it indicates that the current blob is linked to the background plane (id=0).

For each valid blob entry, the ylink field is examined. If the ylink is non-zero, the current blob is vertically linked to another blob on the line below. The ylink is followed to the previous translate table for the line below, and the temporary blob ID content is retrieved and copied to the current line translate table blob entry.

However, if, on the other hand, the current blob does not have a vertical link (e.g., ylink=0) to any previous blobs, then it may be a new blob that is encountered for the first time. A check is first made to see if the current scan table entry is horizontally linked to any other scan table entry on the current line. A valid blob not horizontally linked to any other blob has an xlink value pointing back to its own blob entry as implied by the circular xlink list. If the current blob is determined to be horizontally linked to other blobs, the corresponding blob entry is set to zero in the translate table, and a flag "HasTerminalX" is turned on, to indicate this condition occurred. In a subsequent step, the bottom-to-top module 620 may further examine such horizontally-linked translate table blob entries to determine whether to assign new temporary blob ID to them or not.

If the current blob is valid, has a zero ylink, and has an xlink value that points back to itself in a circular manner, then it may considered to be a valid new blob encountered for the first time. The next available temporary ID is assigned to it from the ID Stack, and is inserted in the current translate table to indicate that the current scan table entry is now associated with this new temporary ID. At the same time, the ID Stack counter will be decremented by one, now pointing to the next available free temporary ID. The current temporary ID will remain in use until freed by the GTB generator 680, as will be described below. The bottom-to-top module 620 maintains the temporary blob ID and updates the temporary blob information as it continues to assign scan table entries to temporary blobs.

Finally, if the current blob xlink field is zero, then it is considered to be linked to the background plane. The corresponding translate table entry is set to zero.

After the scan table translation process completed a first pass through the scan table entries to create an initial translate table, a second pass may be performed if the "HasTerminalX" flag is turned on, indicating that at least one blob was determined to be horizontally linked to another blob on the current line. In this second pass, only blob entries in the translate table which were previously set to zero are examined. For each such blob entry in the current translate table, the xlink and ylink values are again retrieved from the current scan table. If ylink=0, and xlink is nonzero, a new temporary ID is obtained from the ID stack as described above, and is assigned to the current entry in the translate table. In addition, the xlink field is followed to the next horizontally linked blob entry, if any, and the corresponding translate table entry for this blob is also assigned the same new temporary ID number. This process repeats through all the horizontally linked blobs, until it reaches a next xlink value that points back to the very first starting blob ID. This process ensures that the entire chain of horizontally linked blobs is consistently assigned the same new temporary ID number.

When the scan table translator 670 completes its task with up to 2 passes per line, all valid blobs in the current scan table will have valid temporary blob ID numbers in the translate table entries. These values are referred to as the temporary blob ID numbers, since they will be used only until the blob is closed and exported to the GTB by the GTB generator 680.

Returning to the example illustrated by FIG. 5, for the example line shown in the figure, the fourth scan table entry is shown in FIG. 7. The xlink field is valid (4.xlink>0) and is vertically connected to blob 3 on the line below. When the ylink field is followed down to the scan table on the line below, it is found that 3.ylink=1, that is, temporary blob id #1 in the first (bottom) line of the blob is vertically linked to scan table blob ID #3. The new ylink value of 1 is copied to the current translate table entry of the current blob id #4 in the scan table, so that now 4.ylink=1 (temporary ID). Since the two scan table blobs in this example are vertically linked, the temporary blob ID assignment from the translate table of the line below is copied into the current translate table entry. By extending this process upward, the first temporary blob ID associated with this group of pixels forming a blob (as allocated to the bottom most scan table blob) will be propagated upwards and be the same for all of the vertically connected blobs.

Figure 11:
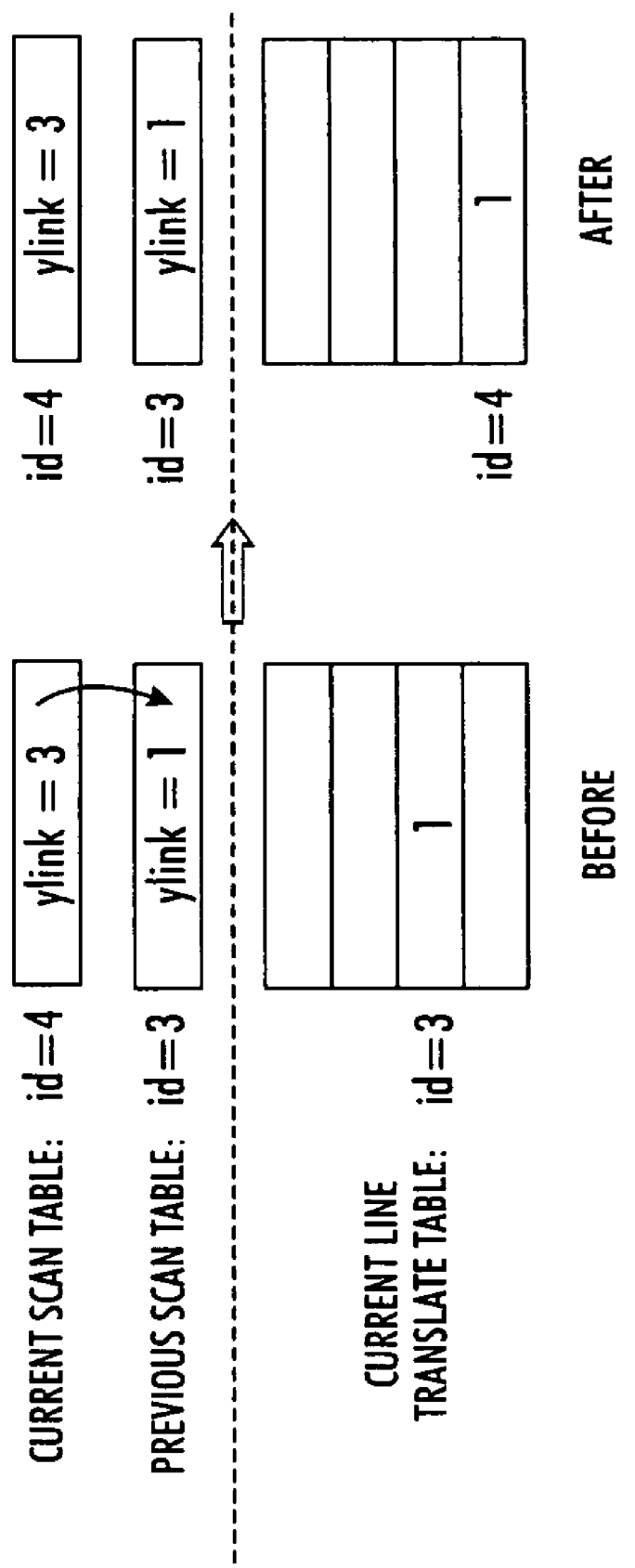
FIG. 11 illustrates how scan table entries are linked vertically.

FIG. 11 illustrates the before and after values of the translate table for the example shown in FIG. 5. As can be seen by comparing the before and after values, the effect is that the temporary blob ID (#1) associated with the link on the line below, as indicated in the translate table of the line below, is inserted as the current translate table entry. This process will repeat itself for all vertically connected blobs on the lines above, thereby assigning the same temporary ID to all of them in their corresponding translate tables.

Therefore, the task of the bottom-to-top module 620 is to create two-dimensional blobs from the essentially one-dimensional scan table information generated by the top-to-bottom module 610, by linking the one-dimensional blobs together either vertically or horizontally using the translate table entries. The two-dimensional blobs are each identified by the temporary blob ID which is the temporary list of two dimensional blobs being assembled by the bottom-to-top module 620. Each time a new blob is encountered on a scan line, which is not already linked vertically, it is given a new temporary blob ID. If it is a new blob that is horizontally linked to other blobs on the current line, the same new temporary blob ID is consistently assigned to all such horizontally linked blobs. As this ID is referred to by subsequent scan lines, the new pixels are associated with the same temporary blob ID.

The blob content updater 675 process begins after the scan table translation 670 has finished processing the current line. The blob content updater 675 maintains a blob structure with multiple fields for each temporary blob ID. At the end of each line, the blob content updater 675 updates the blob structures for each active temporary blob ID to include the information of new pixels from the current line associated with each open ID. For each valid blob entry in the current scan table, the blob content updater 675 looks up the translate table to determine the corresponding temporary blob ID number. The blob content updater 675 then updates the various fields associated with the particular temporary blob ID entry in the blob table.

The blob content updater 675 then scans the BID image from left to right (in raster order), for the current scan line, one pixel at a time. For each pixel, the initial BID value indicates the local scan table blob ID associated with the current pixel. This scan table ID entry is looked up in the current scan table (for the current line), and is followed to the corresponding temporary blob ID by looking up the current translate table entry.

The blob structure entries corresponding to the temporary blob ID are updated to include any new pixels associated with this temporary blob ID on the current line. Specifically, the fields in the temporary blob table entry are updated as follows:

(i) min_y is set to the current line (if line number<min_y)

(ii) max_y is set to the current line (if line number>max_y)

(iii) min_x is set to the current pixel (if pixel<min_x)

(iv) max_x is set to the current pixel (if pixel>max_x)

(v) The number of pixels in the local scan table blob is added to count (vi) The variance in the local scan table blob is added to var (vii) The color sums in the local scan table blob are added to sum Y, sum Cb, sum Cr, respectively.

This effectively adds the content of the pixels associated with this local scan table blob to the corresponding temporary blob fields, and updates the temporary blob bounding-box with respect to the current pixel location.

To prevent overflow of the YCC sum fields (sum Y, sum Cb, sum Cr) of each valid (non-background) blob entry in the temporary blob table, these fields may be re-normalized each time the value of any one of them becomes too large. This can be accomplished by dividing the YCC sum fields by 2 and also dividing the count number of pixels by 2, such as to maintain the same ratio.

Figure 12:
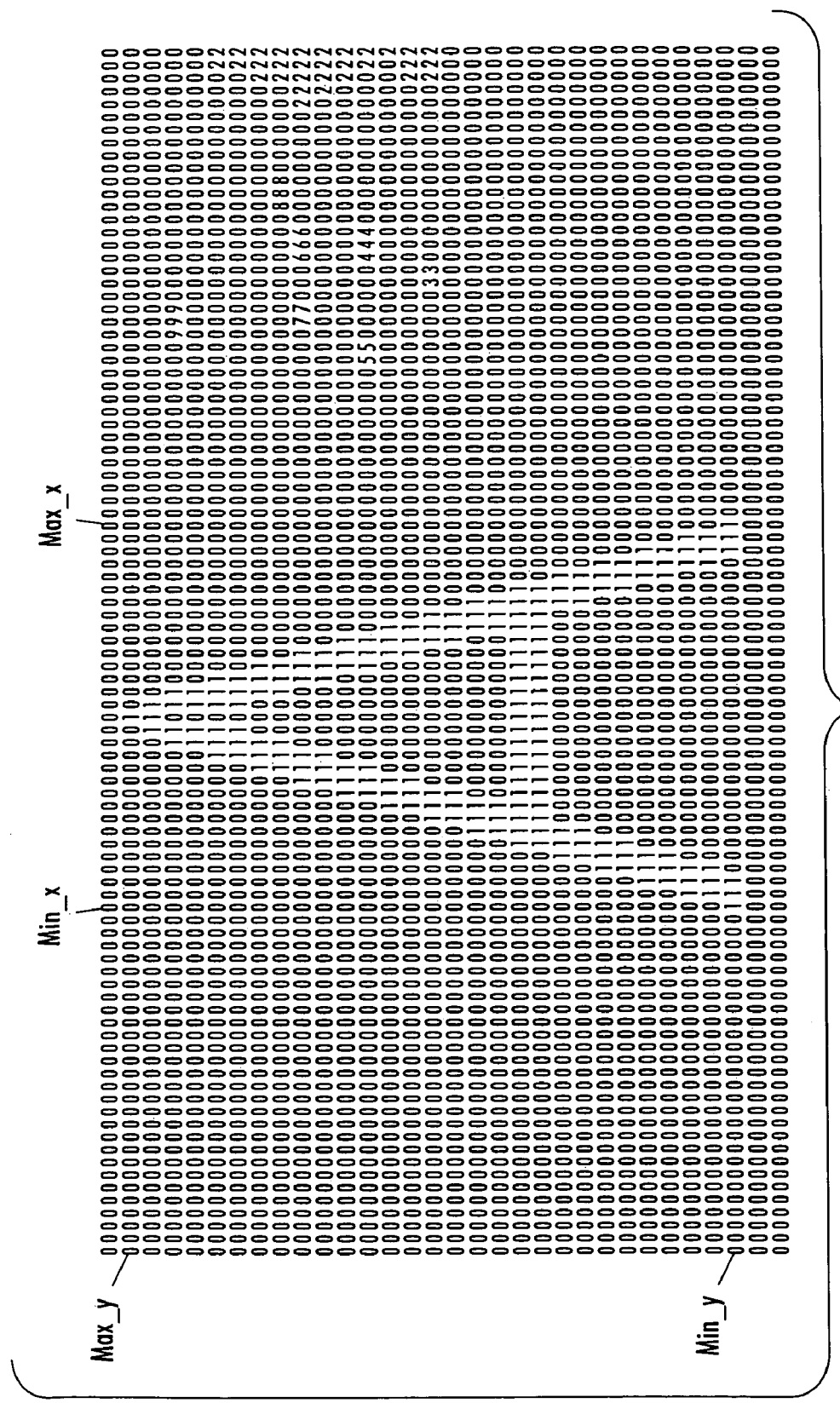
FIG. 12 illustrates an exemplary blob ID image, in which the regions indicated refer to the temporary blob IDs.

Finally, the blob content updater 675 updates the blob ID of the current pixel to point to the temporary blob (that has just been updated) instead of the original local scan table blob. This process updates the BID image to refer to the temporary blob ID numbers instead of the original scan table blob segments. FIG. 12 is the blob ID image from FIG. 4, wherein the blob ID for all pixels in the blob forming the letter "A" have been substituted with the temporary blob ID #1 from the temporary blob ID table, according to the temporary blob ID information of each of the scan lines which constitute a portion of the letter "A". The min_x, max_x, min_y, and max_y are the coordinates of the bounding box surrounding blob #1 as shown in the FIG. 12. Blob #1 can now be closed, because the next line up contains no further pixels associated with blob #1.

The temporary blob ID is kept in effect until a determination is made that the temporary blob can be "closed", that is, that no more pixels on a current scan line are associated with the temporary blob. A temporary blob ID can be closed if (1) the blob does not reach the current scan line (min_y>current line); and (2) the blob has a non-zero count (total number of pixels). In addition, if the current line is the last scan line (line=0), then the blobs are closed because there are no more lines to process. Since the bottom-to-top module 620 works from the bottom of the page to the top, the last scan line is the first line of the image.

For each blob that meets the above conditions, the GTB generator 680 may normalize the temporary blob information by dividing the YCC sums by the count, etc. As the blob entry is exported to the final GTB, blob information content is appended to the GTB, and the temporary blob ID is replaced by the next available ID from GTB (the final blob ID assignment). Thereafter, the temporary blob entry and associated information are removed from the temporary blob table. The export process may include the following steps:

1) Divide the three temporary blob color sums (sum Y/Cb/Cr) by the blob pixel count, and round the result to the next integer value. This operation produces the average blob color. To avoid time consuming operations, the division may be implemented using a lookup table multiply and shift-right operation.

2) Check to make sure there is room for more blobs in the GTB. If there is no space, allocate a new GTB that can hold twice as many blobs, copy the old table content to the new table, and then delete old table. Use the new GTB from this point on. This step may be necessary as the GTB size is variable based on page content and the number of blobs is not known in advance. Step 2 allows the GTB size to dynamically grow (by powers of 2 in this example) as GTB is created.

3) Add a new blob to the GTB by incrementing the GTB count by 1.

4) Copy the content of all fields of the temporary blob entry from the temporary blob table to the GTB under the latest new entry.

When the closed blob is exported to the GTB. it is assigned a new sequential blob id number in the GTB. Unlike the temporary blob table that is limited to 256 entries at most, the blob number in GTB is not restricted and may contain thousands of blobs for a complex page.

After the content of the current temporary blob is entered into the GTB, the temporary blob may be removed from the temporary blob table. The removal process may include the reset of the various blob fields to their default (initial) values. After initialization, the current temporary blob ID is pushed back onto the temporary blob ID Stack. This causes the temporary blob ID to be added as the last stack entry and the stack counter to be incremented by one. As a result, the blob ID is available for re-use. If no additional blob IDs are freed before a new blob is found, the blob ID may be immediately re-allocated to a newly found blob.

Thus, the closed temporary blob is transferred to the GTB, by copying the contents of the associated temporary blob entry. The GTB stores the final list of blobs, as determined by the blob identifying module 600, along with the associated blob information for each blob in the GTB.

The GTB and blob ID image BID are subsequently used by the blob cluster processing module 700, which clusters the blobs in the GTB according to color similarity and spatial overlap. The clusters are then assigned to the binary foreground planes, which may then be output to the compress module 800, and wrapped into a PDF file for further manipulation.

Although the previous description was given with reference to a hardware embodiment, the blob clustering process can also be implemented as software executing on a microprocessor. In this case, each of the steps of the method is carried out by a suitably programmed microprocessor, or by a combination of hardware and software.

Figure 13:
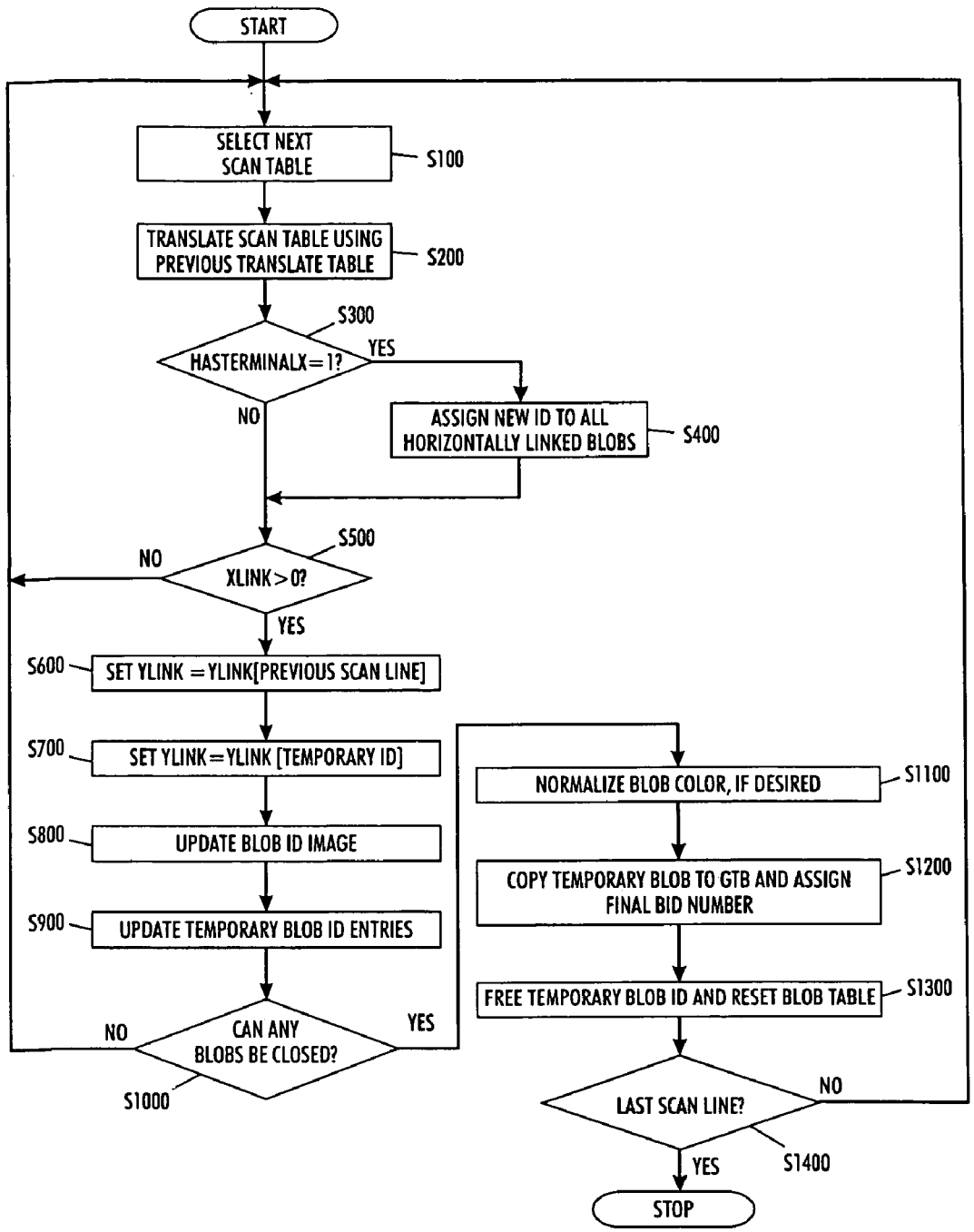
FIG. 13 is a flowchart outlining one exemplary method for generating a global table of blobs and a blob ID image.

FIG. 13 is a flowchart outlining an exemplary method for linking blobs identified in a line scan device. The method begins in step S100, wherein a first or next scan line is selected. The process proceeds to step S200, wherein the scan table is translated. The process then proceeds to step S300, wherein a determination is made whether HasTerminalX been set to 1. If so, the process proceeds to step S400, wherein a new ID is assigned to all horizontally linked blobs. If not, the process proceeds to step S500, wherein a determination is made whether xlink is greater than zero. If so, the process proceeds to step S600. In step S600, the ylink field of the scan table is retrieved, and followed to the previous line. The process proceeds to step S700, wherein the ylink of intervening lines are followed until the bottom line is reached, wherefrom the temporary blob ID is retrieved. The process proceeds to step S800, wherein the blob ID image is substituted with the temporary blob ID in place of the scan table blob ID. The process proceeds to step S900, wherein the temporary blob ID entry is updated to reflect the additional pixels added to the blob from the current scan line. In step S1000, the temporary blob table is evaluated to see if any blobs can be closed. If so, the temporary blob ID entries are normalized by dividing their color sums by the pixel count, in step S1100. The process continues to step S1200, wherein the temporary blob entry is copied to the GTB. In step S1300, the temporary blob ID is initialized and returned to the temporary blob ID table, for further use. The process proceeds to step S1400, wherein a determination is made whether the present scan line is the last scan line. If not, the process jumps back to step S100. If so, the process ends.

Figure 15:
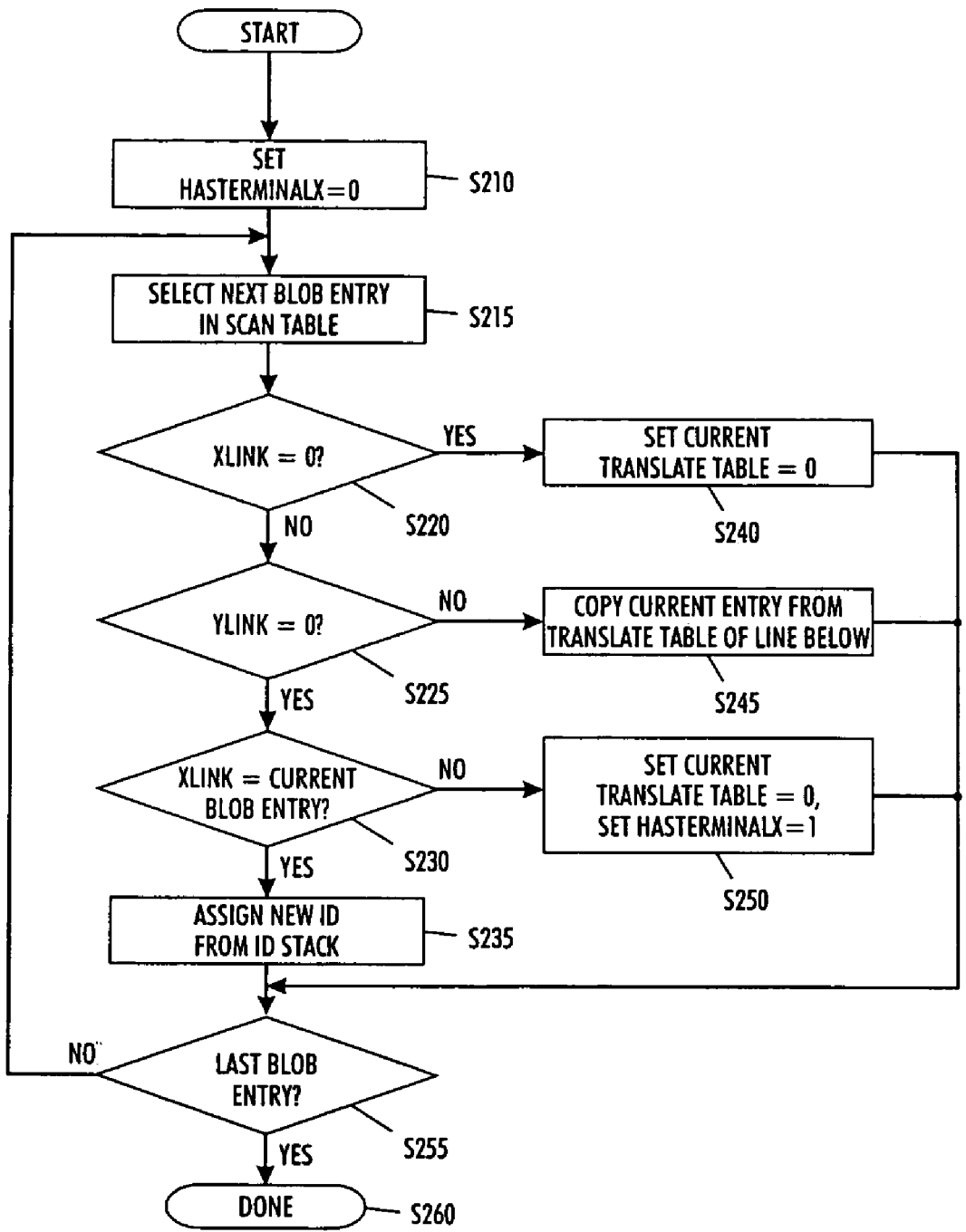
FIG. 15 is a flowchart outlining further detail of the select next scan table step of FIG. 13.

FIG. 15 is a flowchart outlining further detail of step S200 of FIG. 13. The process begins in step S210, in which the flag "HasTerminalX" is set to zero. The process then proceeds to step S215, wherein the next blob entry in the scan table is selected. In step S220, a determination is made whether xlink equals zero. If so, the process proceeds to step S240, wherein the current translate table is set to zero. If not, in step S225 a determination is made whether ylink equals zero. If not, the current entry from the translate table of the line below is copied into the ylink field. If ylink does equal zero in step S225, then a determination is made in step S230 whether xlink equals the current blob entry. If not, the process proceeds to step S250, wherein the current translate table is set to zero, and HasTerminalX is set to one. If xlink does equal the current blob table entry in step S230, then a new ID is assigned in step S235. The process proceeds to step S255, wherein a determination is made whether the entry is the last blob entry in the scan table. If not, the process jumps back to step S215. If so, the process ends in step S260.

Figure 16:
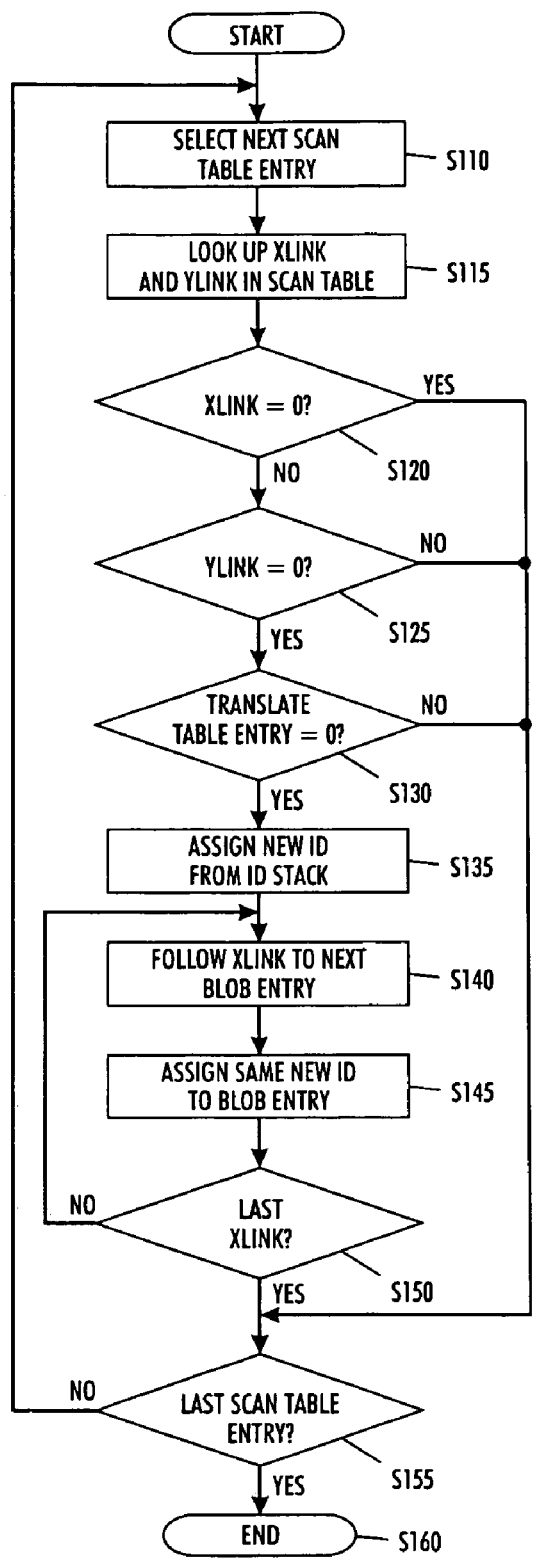
FIG. 16 is a flowchart outlining further detail of the translate scan table step of FIG. 13.

FIG. 16 is a flowchart outlining further detail of step S100 of FIG. 13. The process begins in step S110, wherein the next scan table entry is selected. The process proceeds to step S115, wherein xlink and ylink are looked up in the scan table. In step S120, a determination is made whether xlink equals zero. If not, the process proceeds to step S125, wherein a determination is made whether ylink equals zero. If so, the process proceeds to step S130, wherein a determination is made whether the translate table entry equals zero. If so, a new ID is assigned from the ID stack. The process then proceeds to step S140, wherein xlink is followed to the next blob entry. In step S145, the same new ID is assigned to the blob entry. In step S150, a determination is made whether the last xlink has been evaluated. If not, the process jumps to step S140, wherein the xlink is followed to the next blob entry. If so, the process proceeds to step S155, wherein a determination is made whether the last scan table entry has been evaluated. If not, the process jumps to step S110, wherein the next scan table entry is selected. If the last scan table entry has been evaluated, the process ends in step S160.

While the invention has been described in conjunction with various exemplary embodiments, these embodiments should be viewed as illustrative, not limiting. Various modifications, substitutes, or the like are possible within the spirit and scope of the invention.

What is claimed is:

1. A method for identifying regions of pixels in image data, comprising:
   a) identifying a blob containing pixels in a first line of image data which differ in color characteristics by less than a predefined amount;
   b) associating the blob with a temporary blob identifier;
   c) identifying additional blobs containing pixels in adjacent lines of the image data which differ in color characteristics by less than the predefined amount;
   d) associating the additional blobs with the temporary blob identifier, if the additional blobs are linked to the blob;
   e) counting a total number of the pixels in the blobs associated with the temporary blob identifier; and
   f) calculating a normalized color value for the temporary blob identifier, based on a summation of pixel color values and the total number of pixels in the blobs associated with the temporary blob identifier.

2. The method of claim 1, further comprising:
   storing the temporary blob identifier as a permanent blob, when it is determined that no additional blobs are going to be associated with the temporary blob identifier.

3. A computer-readable medium having computer-readable program code embodied therein, the computer-readable program code performing the method of claim 1.

4. A xerographic marking device using the method of claim 1.

5. A digital photocopier using the method of claim 1.

6. A method for identifying regions of pixels in image data, comprising:
   identifying a blob containing pixels in a peripheral line of image data which differ in color characteristics by less than a predefined amount, and associating the blob with a temporary blob identifier;
   successively identifying a next blob containing pixels which differ in color characteristics by less than the predefined amount starting with a next adjacent line adjacent to the peripheral line;
   associating the next blob with the temporary blob identifier if the next blob is linked to either the blob or a prior next blob which is linked to the blob based on linking information of the next blob;
   continue successively identifying a next blob containing pixels which differ in color characteristics by less than the predefined amount of a next adjacent line adjacent to a new next adjacent line; and
   continuing to associate the next blob of a next adjacent line with the temporary blob identifier until a line is reached which has no blobs linked to the blob;
   counting a total number of the pixels in blobs associated with the temporary blob identifier; and
   calculating a normalized color value for the temporary blob identifier, based on a summation of pixel color values and the total number of pixels in blobs associated with the temporary blob identifier.

7. The method of claim 6, further comprising:
   creating a new temporary blob identifier if a next blob of a new next adjacent line is not linked to a prior next blob on a previous next adjacent line; and
   associating the next blob of a new next adjacent line with the new temporary blob identifier.

8. The method of claim 6, further comprising:
   linking a plurality of next blobs located in a single next adjacent line with a temporary blob identifier, if the blobs are linked horizontally within the next adjacent line, and linked vertically to the blob or the prior next blob which is linked to the blob.

9. The method of claim 6, further comprising:
   storing the temporary blob identifier as a permanent blob, when a next line is not linked to a previous line.

10. The method of claim 9, further comprising:
    initializing the temporary blob identifier after the temporary blob identifier has been stored as the permanent blob.

11. The method of claim 6, further comprising:
    updating a blob identification map, which assigns the temporary blob identifier to pixels associated with the temporary blob identifier.

12. The method of claim 6, further comprising:
    associating the prior next blob and the next blob with the temporary blob identifier, based on a translate table.

13. An image data processing apparatus, comprising:
    a blob processor; and
    a memory coupled to the blob processor, the memory storing link information that links together two or more line blobs of the image data;
    a linking processor coupled to the blob processor, the blob processor assigning pixels in a peripheral line to a blob according to their color characteristics, and pixels in a next adjacent line to a next blob, and provides linking information linking the next blob to the blob according to the color characteristics of the next blob and the blob, wherein the blob processor successively identifies a new next blob on a new next adjacent line adjacent to the next adjacent line according to color characteristics,
    the linking processor linking the new next blob in the next line to a new temporary blob identifier if the new next blob is not linked to any other blobs in a previous next adjacent line, linking the next blob to a previous blob, and linking the previous blob to the temporary blob identifier if the previous blob is linked to the blob, the linking processor associating the next blob on the next adjacent line with the temporary blob identifier, until a line is reached which has no blobs linked to the blob, wherein the temporary blob identifier includes a count of a total number of the pixels in the blobs associated with the temporary blob identifier and includes a calculated normalized color value based on a summation of pixel color values and the total number of pixels in the blobs associated with the temporary blob identifier, and
    wherein the blob processor groups line blobs of a line and of continuously adjacent lines that are linked together into a single blob and assigns a unique blob ID to the single blob.

14. The apparatus of claim 13, further comprising a scan table translator that associates the next blob and the previous blob with the temporary blob identifier.

15. The apparatus of claim 13, further comprising:
    a blob content updater for updating a blob ID map to assign pixels in the current line to the temporary blob identifier which are associated with the temporary blob identifier.

16. The apparatus of claim 15, wherein the blob content updater also maintains information on the total pixel count contained in the temporary blob.

17. The apparatus of claim 13, further comprising:
    a horizontal blob identifier which for detects the state of a flag, which indicates whether a next blob is horizontally linked to any other blobs on the same next adjacent line, and vertically linked to the previous blob, and if so, links each of the horizontally linked blobs to the temporary blob identifier.

18. The apparatus of claim 13, wherein the temporary blob identifier is obtained by following a ylink field, which associates the next blob with the previous blob, wherein the previous blob is linked to the temporary blob identifier by a translate table.

19. The apparatus of claim 13, further comprising:
a blob table generator, for generating a permanent table of blobs entry for the temporary blob identifier, when a next line is not linked to a previous adjacent line.

20. An apparatus for identifying regions in image data, comprising:
means for assigning pixels in a peripheral line to a blob according to their color and edge characteristics, for assigning pixels in a next adjacent line to a next blob, and for providing linking information linking the next blob to the blob according to the color characteristics of the next blob and the blob, for successively identifying a new next blob on a new next adjacent line adjacent to the next adjacent line according to color characteristics;

means for linking the new next blob in the next line to a new temporary blob identifier if the new next blob is not linked to any other blobs in a previous next adjacent line, for linking the next blob to a previous blob, for linking the previous blob to the temporary blob identifier if the previous blob is linked to the blob, and for associating the next blob on the next adjacent line with the temporary blob identifier, until a line is reached which has no blobs linked to the blob;

means for counting a total number of the pixels and the blobs associated with the temporary blob identifier; and means for calculating a normalized color value for the temporary blob identifier, based on a summation of pixel color values in the total number of pixels in the blobs associated with the temporary blob identifier.

21. The apparatus of claim 20, further comprising:
scan table translation means for translating the linking information for a next blob to a previous blob, to linking information for the next blob to the temporary blob identifier;

blob table generating means for storing the information associated with the temporary blob identifier as a permanent blob, when a next adjacent line is reached that has no links to the temporary blob identifier;

blob content updating means for updating the information associated with the temporary blob identifier and updates the blob ID map to use the temporary blob identifiers;

horizontal blob identifying means for detecting whether the next blob is linked horizontally to any other blobs on the next adjacent line, and if so, for linking each of the horizontally linked blobs to the temporary blob identifier.

* * * * *